US012695756B2

(12) United States Patent
Mezghani et al.

(10) Patent No.: US 12,695,756 B2
(45) Date of Patent: Jul. 28, 2026

(54) METHOD AND DEVICE FOR GENERATING AN ALERT

(71) Applicant: Orange, Issy-les-Moulineaux (FR)

(72) Inventors: Emna Mezghani, Issy-les-Moulineaux (FR); Arnaud Brun, Issy-les-Moulineaux (FR)

(73) Assignee: ORANGE, Issy-les-Moulineaux (FR)

( * ) Notice: Subject to any disclaimer, the term of this patent is extended or adjusted under 35 U.S.C. 154(b) by 230 days.

(21) Appl. No.: 18/323,837

(22) Filed: May 25, 2023

(65) Prior Publication Data

US 2023/0388312 A1    Nov. 30, 2023

(30) Foreign Application Priority Data

May 31, 2022    (FR) ........................................ 2205213

(51) Int. Cl.
*H04L 9/40*        (2022.01)
*H04L 67/55*      (2022.01)

(52) U.S. Cl.
CPC .......... *H04L 63/102* (2013.01); *H04L 63/108* (2013.01); *H04L 67/55* (2022.05)

(58) Field of Classification Search
CPC .......................... H04L 63/102; H04L 63/1425
See application file for complete search history.

(56) References Cited

U.S. PATENT DOCUMENTS

| | | | | |
|---|---|---|---|---|
| 9,275,065 B1 * | 3/2016 | Ganesh | .................. | G06F 21/556 |
| 9,385,993 B1 * | 7/2016 | Kulp | .................. | H04L 63/0227 |
| 11,025,638 B2 * | 6/2021 | Ford | ...................... | H04L 63/107 |
| 2007/0100836 A1 * | 5/2007 | Eichstaedt | ............ | G06F 16/958 |
| 2009/0183226 A1 * | 7/2009 | Dean | ....................... | A63F 13/35 726/1 |
| 2009/0288140 A1 * | 11/2009 | Huber | ..................... | G07F 9/001 726/2 |
| 2009/0327908 A1 * | 12/2009 | Hayton | ............... | G06F 21/6218 715/744 |
| 2010/0192201 A1 * | 7/2010 | Shimoni | ................. | G06F 21/55 726/3 |
| 2015/0180746 A1 * | 6/2015 | Day, II | .................... | H04L 67/55 455/405 |
| 2015/0180894 A1 * | 6/2015 | Sadovsky | ............. | H04W 12/12 726/22 |

(Continued)

FOREIGN PATENT DOCUMENTS

| | | |
|---|---|---|
| AU | 2019 100 493 A4 | 6/2019 |
| FR | 3 060 184 A1 | 6/2018 |

OTHER PUBLICATIONS

Translation of FR 3060181 A1, published Jun. 15, 2018, 17 pages. (Year: 2018).*

(Continued)

*Primary Examiner* — Ponnoreay Pich
(74) *Attorney, Agent, or Firm* — Knobbe, Martens, Olson & Bear, LLP

(57)        ABSTRACT

An alert device and method are described. The method is implemented in an electronic device and includes receiving, over at least one time window, of a plurality of content access requests, and generating an alert as a function of at least one frequency of change of a content category between contents associated with at least two of said requests and/or of the time elapsed between two of said requests.

20 Claims, 4 Drawing Sheets

(56) References Cited

U.S. PATENT DOCUMENTS

| | | | |
|---|---|---|---|
| 2016/0006744 A1* | 1/2016 | Du | H04L 67/12 |
| | | | 726/4 |
| 2017/0155669 A1* | 6/2017 | Sudo | H04L 63/101 |
| 2018/0048658 A1* | 2/2018 | Hittel | G06F 21/552 |
| 2018/0288063 A1* | 10/2018 | Koottayi | G06F 21/50 |
| 2023/0107335 A1* | 4/2023 | Garyani | H04L 63/1416 |
| | | | 726/23 |
| 2024/0031371 A1* | 1/2024 | Batni | H04L 63/102 |
| 2024/0205235 A1* | 6/2024 | Batni | H04L 63/107 |

OTHER PUBLICATIONS

French Search Report and Written Opinion dated Jan. 11, 2023 for Application No. FR2205213.

Nguyen, et al: "Kid on the phone! Toward automatic detection of children on mobile devices", 5 ao0t 2018 (Aug. 5, 2018), pp. 1-14, XP093011333, DOI: 10.1016/j.cose.2019.04.001 Extrait de !'Internet: URL: https://arxiv.org/pdf/1808.01680.pdf.

Shaw, et al: "Analyzing the articulation features of children's touchscreen gestures", Proceedings of The 2017 CHI Conference on Human Factors in Computing Systems , CHI '17, ACM Press, New York, New York, USA, Oct. 31, 2016 (Oct. 31, 2016), pp. 333-340.

* cited by examiner

[Fig. 1A-1D]
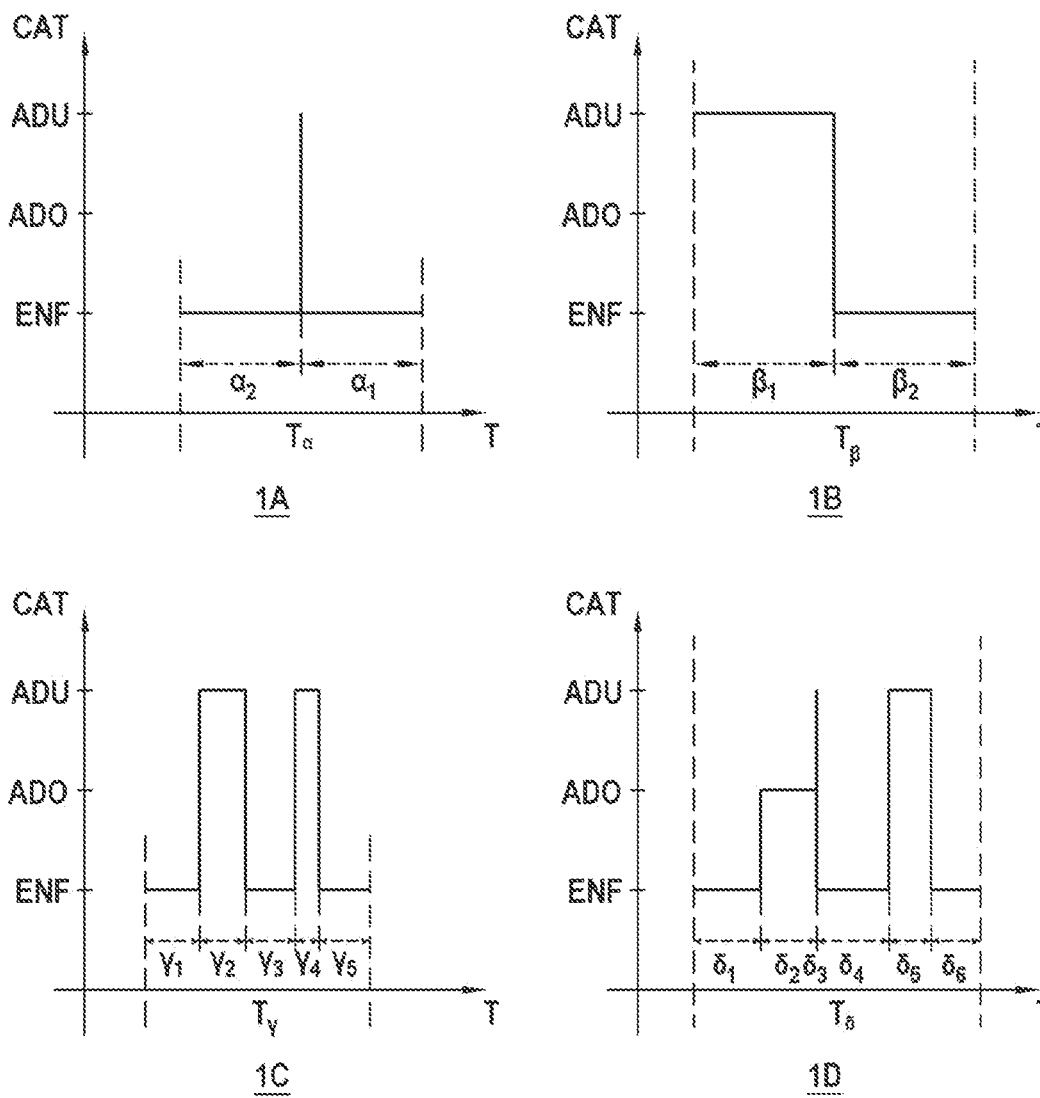
[Fig. 2]
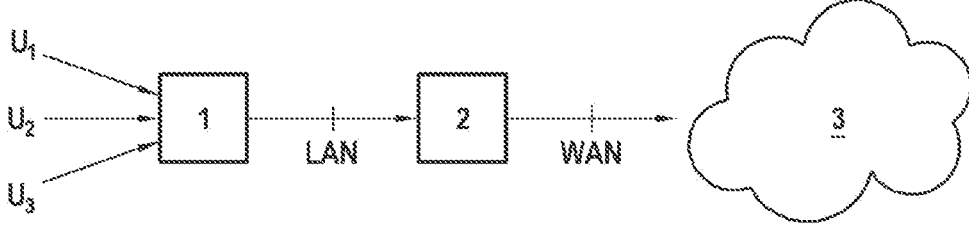

[Fig. 3]
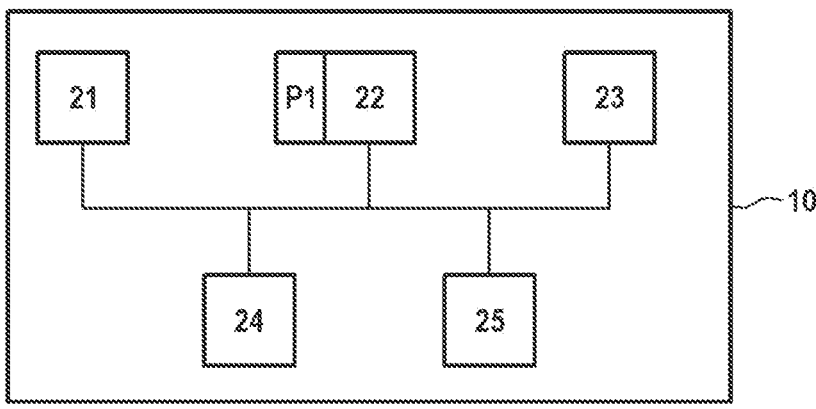
[Fig. 4]
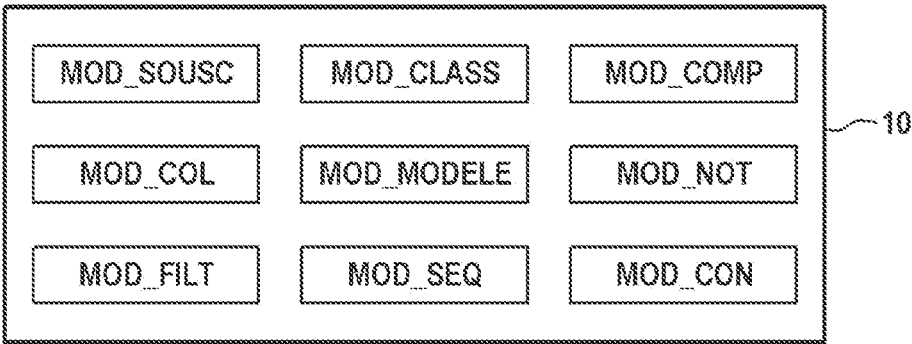

[Fig. 5A-5F]
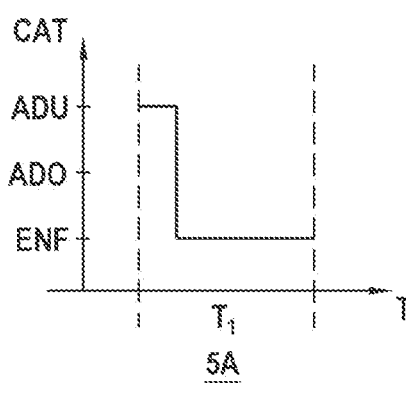
5A
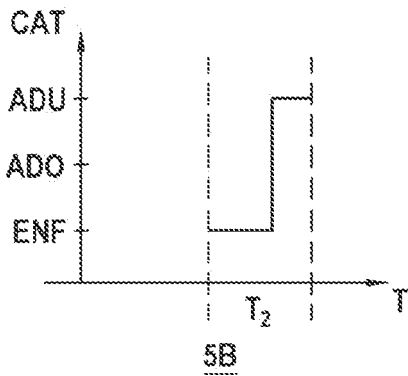
5B
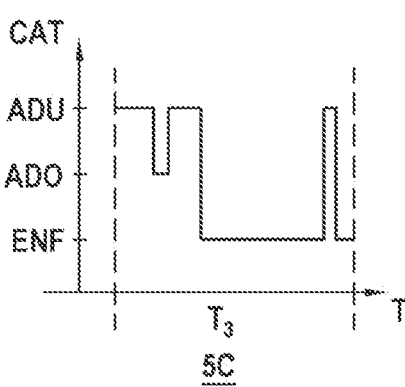
5C
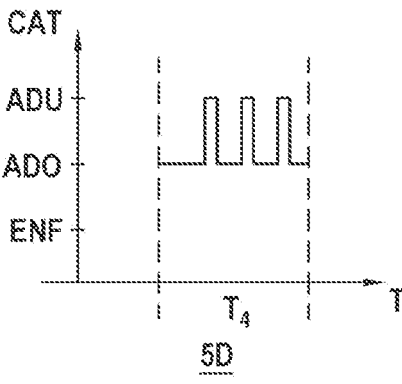
5D
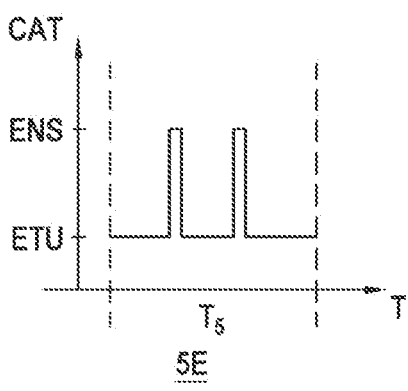
5E
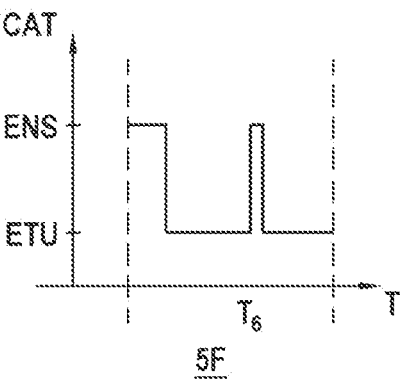
5F

[Fig. 6]
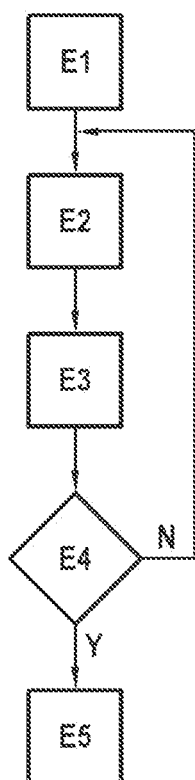

METHOD AND DEVICE FOR GENERATING AN ALERT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2205213, filed May 31, 2022, the disclosure of which is hereby incorporated by reference in its entirety.

BACKGROUND

Technical Field

Embodiments of the disclosed technology relate to the field of content access control.

Description of the Related Art

Many solutions for controlling access to contents, and in particular to online content, have been developed, in particular parental control solutions to prevent young children or teenagers from accessing online content that would be harmful to them. It is in particular known to restrict access to terminals or applications housed on, or accessible by, these terminals by password. It is also known not to allow access to some websites for young children by creating lists of unauthorized sites, and therefore blocked when the child tries to access them. Keeping such lists up to date becomes very difficult, given the multiplicity of the sites and the impossibility of listing them all. In addition, existing solutions often require the transmission of personal information on users from a home to outside the home (for processing by a remote server, for example) and generate risks of data theft. When terminals are shared by several users, which is often the case with tablets for example, it is all the more difficult to control the use made of them by children and teenagers because very often these devices are freely accessible and the devices like the applications installed on them, are not accessible by password. There is therefore a need to control access to data.

SUMMARY

The disclosed technology proposes to overcome at least one drawback of the prior art by proposing an alert method implemented in an electronic device comprising:
- a receipt, over at least one time window, of a plurality of content access requests,
- a generation of an alert as a function of at least one frequency of change of a content category between contents associated with at least two of said requests and/or of the time elapsed between two of said requests.

According to at least one embodiment, said time window does not comprise a period of inactivity of said electronic device.

According to at least one embodiment, the method comprises:
- the determination of at least one pattern, as a function of said categories, of frequencies of change from one category to another of content access requests, and/or of the time elapsed between two requests, the generation of an alert being determined from said at least one pattern and said requests received over said at least one time window.

According to at least one embodiment,
- said requests are issued by a terminal and said alert relates to at least one access of a user of said terminal during said at least one time period,
- said patterns are associated with a user profile,
- said generation of an alert takes into account a profile of the user of the terminal based on information on the sequencing of said requests received prior to or during said time period.

According to at least one embodiment, said generation of an alert takes into account at least a distance between said at least one pattern and said sequencing of said requests received during said time period.

According to at least one embodiment, said user profile is related to the age or/and to the function of said user and said categories are related to the age or to the function of said user, said categories being parameterizable.

According to at least one embodiment, the generation of an alert comprises one or more of:
- a transmission of at least one notification to a terminal having issued said requests,
- a transmission of at least one notification to an administrator terminal different from said terminal having issued the requests,
- said notifications can be transmitted in one or more forms chosen from:
- a text message,
- an email,
- a message intended to be displayed on a terminal,
- a message intended for an application recorded on a terminal.

According to at least one embodiment, said receipt and said generation of an alert are made over a plurality of time windows, said transmission of at least one notification being triggered following the generation of an alert over at least two time windows.

According to at least one embodiment, the generation of an alert comprises the recording of information relating to said alert in said device and/or in a remote device.

The characteristics, presented separately in the present application in relation to some embodiments of the method of the present application can be combined with each other according to other embodiments of the present method.

Embodiments of the disclosed technology also relate to a computer program comprising instructions for executing the steps of the method according to the disclosed technology, according to any one of its embodiments, when said program is executed by a computer.

Embodiments of the disclosed technology also relate to a computer-readable recording medium on which is recorded a computer program comprising instructions for executing the steps of the method according to the disclosed technology, according to any one of its embodiments.

Embodiments of the disclosed technology also relate to a device for generating an alert comprising one or more processors configured together or separately for instructions for executing the steps of the method according to the disclosed technology, according to any one of its embodiments. Thus, embodiments of the disclosed technology also relate to a device for generating an alert comprising one or more processors configured together or separately to:

receive, over at least one time window, a plurality of
content access requests, generate an alert as a function of at least one frequency of
change of a content category between contents associ-
ated with at least two of said requests and/or of the time
elapsed between two of said requests.

BRIEF DESCRIPTION OF THE DRAWINGS

Other characteristics and advantages of the disclosed
technology will emerge from the description given below,
with reference to the appended drawings which illustrate an
exemplary embodiment devoid of any limitation.

FIGS. 1A to 1D represent examples of requests for
contents of different categories by users.

FIG. 2 represents a system according to some embodi-
ments of the disclosed technology.

FIG. 3 schematically represents an example of hardware
architecture of a device able to implement the disclosed
technology, according to some embodiments.

FIG. 4 schematically represents a functional breakdown
of a device able to implement the disclosed technology
according to some embodiments.

FIGS. 5A to 5F represent examples of patterns according
to some embodiments of the disclosed technology.

FIG. 6 represents a method according to some embodi-
ments of the invention.

DETAILED DESCRIPTION

The present disclosure is in the context of detection of
suspicious user behaviors. More particularly, but without
limitation, the present disclosure can help to improve paren-
tal control. Thus, it can help to detect requests for access to
adult contents by child users of a terminal such as a shared
terminal.

According to the present disclosure, suspicious behavior
means unexpected use by a current user of a terminal (i.e. a
use that does not correspond to an intended or authorized use
by an administrator or a main user of the terminal). Thus, an
example of suspicious behavior may be an access, or a
request for access, to content and/or to functions that are not
suited to the current user or to the profile of the current user.
By function, it is also meant here for example payment
functions, online chat functions, social network consultation
functions. By content, it is meant video or audio content, but
also access to social networks. Suspicious behavior can also
be at least prolonged access to at least a certain type of
content. For example, parents may want to restrict access to
gaming websites or gaming applications to their children, in
terms of game time. Suspicious behavior for a child may
then be related to a prolonged use, beyond the maximum
time authorized by the parents.

According to embodiments of the disclosed technology,
by request it is meant for example requests of the DNS
(Domain Name System) type and more generally accesses to
contents recorded or available online, via websites for
example. It also meant access to applications. Applications
are often installed on terminals such as tablets and allow
access to different contents and/or also allow users to play,
pay online, or perform other actions.

According to some embodiments, the disclosed technol-
ogy also makes it possible to detect access to some contents,
for example in the professional field or on public terminals,
on which the users do not need to identify themselves
personally prior to use.

FIGS. 1A-1D illustrate embodiments implemented in the
case of parental control and represent different requests for
contents by a user of a terminal. This terminal can be a
shared terminal but not only. By shared terminal, it is meant
a terminal capable of being used in turn by several users, for
example when the terminal does not require authentication
by the user during its use. In general, parental control
systems can be associated with child user profiles on com-
puters. On mobile devices such as tablets, connected tele-
visions or mobile phones, it is common that no authentica-
tion is necessary for use. In general, these terminals are
accessible to everyone in a family context for example, and
these are shared devices within the meaning of the present
disclosure.

Thus, in some embodiments, the present disclosure pro-
poses to define content categories. In the example illustrated,
relating to parental control, the categories can be related to
an age of the users (for example each associated with an age
group).

For example, three categories can be defined, "adult",
"teenager" and "young child". These categories can be for
example associated with the following age groups:

young child: age strictly below 13 years, teenager: between 13 and 17 years old inclusive, adult: age over or equal to 18 years.

The age groups and/or the categories can be for example
entered in the system beforehand (by default by a manufac-
turer of the device or a computer program provider execut-
ing the method which is the subject of the present applica-
tion, for example) and/or can be parameterized by an
administrator or a main (or trusted) user (a parent for
example).

FIGS. 1A-1D represent examples of suspicious or non-
suspicious behavior patterns within the meaning of the
present disclosure. These figures represent requests for con-
tents associated with different categories during time win-
dows, from a shared terminal. In these examples and in the
remainder of the description, transient duration refers to a
sufficiently short duration, corresponding to a few seconds
for example (such as one, two or three seconds for example)
and a non-transient duration refers to a duration greater than
3 seconds. When a user makes a request for access to content
for a transient duration, this access request is considered to
be made inadvertently or by mistake. Indeed, the user does
not have time to watch the content for such a short duration.

In FIGS. 1A to 1D, on the ordinate axis, the "adult"
category is referenced ADU, the "child" category is refer-
enced ENF and the "teenager" category is referenced ADO.
Time (T) is represented on the abscissa axis.

In FIGS. 1A to 1D, it is considered that during the
considered time window(s), requests are continuously made,
that is to say the time window comprises successive requests
for a period of activity of the terminal. This can mean that
a new time period starts when the terminal becomes active
again after a period of inactivity, that is to say new requests
are made. However, in other embodiments, it can be pro-
vided that the time window comprises periods of inactivity
of the terminal, that is to say periods during which no request
is received and no consultation (following a request) is
made. The size of the time window can be of the order of a
few minutes or a few tens of minutes, depending on the
embodiments, for example 20 minutes. In some embodi-
ments, it is of parameterizable size.

FIG. 1A represents a first example of requests during a
time window T. During this time window Tα, three requests
for access to contents of different categories are made. A first
request to access "child" category content is made. It should be noted that by request it is meant a first request for access to content possibly followed by at least partial receipt of this content during a time interval. The content can be for example streaming content but it can also be content from the same website (such as different photographs available on the same website) or from several websites. As indicated previously, the requests can be also requests for access via an application, such as the applications available on mobile phones. In FIG. 1A, for example during a duration α1, the user makes one or more requests for different contents but which remain in the "young child" category. Then after a very short duration, the user makes a request to an adult-type category. It is observed that this request is temporary and very short in time, the duration is considered as transient duration. It can for example correspond to an error from the user who immediately makes a request for child content again and remains on child content for a period of time α2. Of course, the durations can vary according to the examples considered. Thus, the durations α1 and α2 can be for example durations of the order of 30 s to several minutes, or several hours. The behavior pattern represented in FIG. 1A is not considered, at least in some embodiments, as suspicious behavior within the meaning of the disclosed technology. Indeed, the profile of the associated user, that is to say the user who makes the content requests, does correspond to that of a child since most of the content accessed is child content.

FIG. 1B represents a second example of requests during a time window Tβ During this time window Tβ, one or more requests for contents of different categories are made. During a first time interval β1, of a duration sufficiently long not to consider that it is an inadvertent content access, that is to say greater than 5 seconds for example, one or more requests for contents associated to the "adult" category are made. The system therefore detects a behavior of an adult user. Then, during a second consecutive time interval β1, one or more requests for access to content associated with the "child" category are made. An adult user rarely watches child content for a long enough period of time, the system can therefore detect here suspicious behavior corresponding to a behavior of a child who watched adult content during the period β1. However, a behavior such as the one represented in this figure can also correspond to a change of user of the terminal, such as for example a change from an "adult" user to a "child" user. Several successive changes from the "adult" to "child" category can enhance the detection of suspicious behavior. In some embodiments, as a function of the confidence of the detection, a confidence score can be calculated, as indicated below, and a different action as a function of the confidence score can be taken, namely for example the sending of a notification either to the suspected terminal or to a remote terminal. For example, if the confidence score is low, then an alert can be transmitted to the suspected terminal, and if it is high then a notification can be transmitted to a remote terminal.

FIG. 1C represents a third example of requests during a time window Tγ. During this time window, one or more requests for contents of different categories are made. During a first non-transient time interval γ1, one or more requests for content associated with the "child" category are made. Then during a second non-transient time interval γ2, one or more requests for content associated with the "adult" category are made. Then during a third non-transient time interval γ3, one or more requests for content associated with the "child" category are made. Then, during a fourth non-transient time interval γ4, one or more requests for content associated with the "adult" category are made. Then, during a fifth non-transient time interval γ5, one or more requests for content associated with the "child" category are made.

The system will detect suspicious behavior during the time interval Tγ because it is impossible to detect whether the user making the requests is a child or an adult. It is also quite possible that the system can detect a "child" behavior during the first time interval γ1 then detects an "adult" behavior during the period γ2. Thus, immediately after the period γ2, the system is capable of determining that this is suspicious behavior, that of a child watching adult content. The observation periods γ3, γ4, γ5 enhance this detection of suspicious behavior.

FIG. 1D represents a fourth example of requests during a time window Tδ. During this time window, one or more requests for contents of different categories are made. During a first non-transient time interval δ1, one or more requests for content associated with the "child" category are made. During a second non-transient time interval δ2, one or more requests for content associated with the "teenager" category are made. At the end of these two time intervals, it is difficult for the system to detect which user profile is associated with the user using the terminal, it may be a teenager or a child. Such a profile may however have been categorized by the system as suspicious profile, that of a child who was watching teenager content. In such a case, the detection of suspicious behavior can be made at the end of the time interval δ2. If the profile observed during the two consecutive time intervals δ1, δ2 is not detected as suspicious, the observation period can be extended.

In a third transient time interval δ3, a request for adult content is made but very briefly, for one to two seconds for example, which corresponds to an error from the user, and to a request for adult content made inadvertently. Then, following this time interval δ3, one or more requests for content associated with the "child" category are made during a non-transient time interval δ4. The system can determine here that the user of the shared system is probably a child because the requests for child content are the largest and the longest, namely the periods δ1 and δ4. At the end of the period M, suspicious behavior can therefore be detected. Following the non-transient period δ4, one or more requests for "adult" category contents are made. At the end of the period δ5, the system detects suspicious behavior because the behavior of the user during the periods δ1 to δ4 can mean that the user is a child or a teenager, who makes requests for adult content during the period δ5. This can further be possibly confirmed by extending the time observation period beyond δ5, for a period δ6. During a non-transient period δ6, one or more requests for child content are made. This makes it possible to confirm a child user profile and therefore detect suspicious behavior.

The examples described with reference to FIGS. 1A to 1D illustrate the detection of suspicious behavior during a time period, the duration of which may possibly depend on whether or not suspicious behavior has been detected during this duration. In some embodiments, as long as no suspicious behavior has been determined, the observation period can be extended and the time window continues. In some embodiments, it can for example be a sliding time window as mentioned below.

Thus, according to the embodiments, the length of the time window can be:
    fixed, or
    parameterized or
    activated as long as requests are issued or
    activated as long as requests are issued and no alert has
        been generated.

According to the examples in FIG. 1, transitions only between categories allowing the detection of suspicious behavior are shown. According to other embodiments, the access requests can also be associated with uncategorized content or in categories that do not allow the detection of suspicious behavior. These requests can be filtered out of consideration. Thus, according to the examples of FIG. 1, there may be in the time window requests for contents that are not categorized or categorized in non-useful categories, between the requests in the categories taken into account by the present disclosure.

FIG. 2 represents a system for implementing one preferred embodiment of the present disclosure.

The system in FIG. 2 comprises a terminal 1 connected to an access gateway 2 through a first local type network, such as a wired or wireless Ethernet network, or a cellular network for example. The access gateway 2 is connected to an external network, of internet or cellular type, to remote network equipment, located or managed by an operator, for example a telecommunications operator. It should be noted that the access gateway is generally connected to several devices such as the device 1, which can be shared of the tablet or mobile phone type or not be shared of the personal computer type. The terminal 1 can be used by n users (n integer greater than 1). Among these n users, at least some can be associated with different user profiles. For example, in a home environment, these profiles can comprise an adult profile, a teenager profile, a child profile. In other environments, such as school or university environments, these profiles can for example comprise a student profile or a teacher profile, for example. The number of profiles can of course vary according to the embodiments.

The terminal 1 is for example a self-service terminal in its environment, such as a terminal that does not require logging into an account to use it, typically a tablet, a connected television, etc. Thus, it may be difficult to automatically detect at any time who is the user of the terminal and therefore to detect what is the profile of the user.

The present disclosure advantageously makes it possible to simply deploy a solution for controlling access to content or to online functions or functions on non-remote servers, from terminals, and more particularly in some embodiments, to generate an alert following the control of the content access requests.

The method which is the subject of the present application, for example in the embodiments described in FIG. 5, can for example be implemented on the terminal 1 or on the gateway 2. This has the advantage of not needing to process personal user (s) data outside the local area network and therefore protects their personal data.

FIG. 2 represents an example of at least part of hardware architecture 10 of the terminal 1 or of the gateway 2, allowing the implementation of a method according to embodiments of the disclosed technology and as represented for example in FIG. 6. This hardware architecture is that of a computer. Other hardware architecture elements are present in the terminal 1 or in the gateway 2 and not represented here.

The hardware architecture 10 comprises one or more processors 21 (only one is represented in FIG. 2) implementing a method according to the present disclosure, a read only memory 22 (of the ROM type), a rewritable non-volatile memory 23 (of the EEPROM or Flash NAND type for example), a rewritable volatile memory 24 (of the RAM type), a communication interface 25 with the gateway 2. The read only memory 22 constitutes a recording medium in accordance with one exemplary embodiment of the disclosed technology, readable by the processor(s) 21 and on which is recorded a computer program P1 in accordance with one exemplary embodiment of the disclosed technology including instructions for executing steps of the suspicious behavior detection method according to the disclosed technology. Alternatively, the computer program P1 is stored in the rewritable non-volatile memory 23.

The computer program P1 can allow the terminal 1 or the gateway 2 to implement at least part of the method in accordance with the present disclosure and as illustrated for example in FIG. 5.

This computer program P1 can thus define functional and software modules, configured to implement the steps of an alert method in accordance with one exemplary embodiment of the disclosed technology, or at least part of these steps. These functional modules are based on or control the hardware elements 21, 22, 23, 24, 25 of the terminal 1 or of the access gateway 2 mentioned above.

FIG. 4 represents these functional modules that rely on or control the hardware elements 21 to 25 of the device mentioned above. Some of these functional modules may be optional in some embodiments.

In the example of FIG. 4, the functional modules comprise in particular:

a subscription module MOD_SOUSC configured to subscribe to an internet operator, a suspicious behavior detection service. The internet operator is for example a telecommunication operator allowing access to the network external to the terminals present on the local area network. This internet operator can for example also be the provider of the access gateway 2. The subscription can also comprise or be followed by a declaration of the composition of the group(s) of users sharing at least one terminal, i.e. potential users of the terminals connected to the gateway 2 in the illustrated example. This declaration can comprise, depending on the type of environment, an association with at least one potential user of a category or of a provision of information allowing the system to associate a category with the potential user. In a home environment, categories by age, for example, adult, child, teenager are envisaged and can be established by obtaining the age or the date of birth of the users. In a university environment, this may be a category by function, student or teacher for example. This declaration can be made by an administrator of the local area network. During subscription, the list of the terminals can also be declared as well as, optionally, the type of the terminals in some embodiments.

The functional modules can also comprise, in some embodiments, a module for collecting requests MOD_COL made from at least one of the terminals. The content access requests are requests which typically contain content addresses located either inside the local area network, on another device connected to the access gateway 2, another terminal or a storage means for example, or and more generally contents located remotely, for example on websites or data streaming servers. The requests collected can be transmitted to a filtering module MOD_FILT (another functional module) which makes it possible to filter the collection of the requests received on the gateway 2. This filtering module can be optional in some embodiments.

This filtering module can allow, in some embodiments, the method to consider only the requests coming from some terminals. This filtering module is linked for example to a module for knowing the terminals connected to the access gateway 2 MOD_CON, only present in the access gateway and representing a list of the terminals at the current time connected to the access gateway 2 and their type. In some embodiments, this filtering module can also select part of the devices among the plurality of devices. This selection can be parameterized, for example by the administrator of the local area network. In this case, when the method according to embodiments of the disclosed technology is implemented in the terminals and not in the access gateway, the filtering module may not filter the requests coming from some terminals.

In other embodiments, the filtering module can also filter content access requests as a function of the category of the requested content. For example, when a content category is defined as being accessible by all the users, for example a meteorological site, a site relating to a city . . . then it can be categorized (in an additional category for example) as "all users" and not be part of the contents taken into account by said method.

In some embodiments, the functional modules can also comprise a sequencing module MOD_SEQ associating with a request a time t at which it is made. This association makes it possible to determine time information on the sequencing of the requests as described in FIG. 1.

In some operating modes, the functional modules can also comprise a classification module MOD_CLASS. The classification of the consulted content (categorization of the consulted sites/applications) can be done in different ways based on:

a database that lists all the applications/sites with a categorization, this requires resources for the storage and requires that the classification is the appropriate one, namely parental control (child/teenager/parent classification) or educational environment (teacher/student), or the like intelligent software that classifies the content by analyzing the internet address (URL) encapsulated in the DNS request with filtering, learning and natural language processing (NLP) techniques. The learning phase can be done upstream, for example at the operator's location with whom the service has been subscribed and then deployed in an equipment at the user's location, at the level of the terminals or of the access gateway. The operator can also propose categories that correspond to the need of the user who has subscribed to the service it can also be envisaged in other embodiments that the user can provide classification information himself or modify or refine the classifications proposed either by the operator or by the intelligent software. In such a case, the module MOD_CLASS can for example in the form of a man-machine interface, easily allow the user to intervene on the proposed classification or to assign a classification. The module can also allow the assignment of a classification to a newly installed application (or during the installation thereof) on the shared terminal. In general, the classification can be done dynamically, either automatically or manually, as explained by the previous examples.

The functional modules can also comprise, in some embodiments, a module MOD_MODELE configured to establish patterns defining suspicious behaviors for a type of user. A pattern is defined by a sequence of requests at times, for example consecutive times, and each associated with a category. Examples of patterns are described below with reference to FIG. 5. The module MOD_MODELE can therefore be customized as a function of the desired categories. The categories are therefore parameterizable. The module MOD_MODELE can therefore cooperate with the module MOD_SOUSC to obtain information relating to the users and to the subscribed service in order to determine the desired categories used for the establishment of the patterns.

The functional modules can also comprise a module MOD_COMP configured to compare the request sequences transmitted by the user of the shared terminal and the patterns defined by the module MOD_MODELE in order to determine suspicious behavior.

Finally, functional modules can comprise a module MOD-NOT configured to transmit a notification or an alarm to a device for signaling suspicious behavior. This notification can be transmitted to the user of the shared terminal whose behavior is detected as suspicious to warn him and/or can also be transmitted to an administrator of the network or to a main user of the terminal, for example the parent(s) in the case of parental controls, to warn them of suspicious behavior. In this case, the notification can be transmitted on a device held by the parent, for example on his mobile phone or his personal computer.

FIG. 5 represents a set of examples of suspicious behavior patterns as determined (detected) by the module MOD_MODELE and used by the method of FIG. 6, in some of these embodiments. Of course, this set is given for illustrative purposes and does not correspond to an exhaustive list of the suspicious behavior patterns.

In FIGS. 5A to 5D, on the ordinate axis, the "adult" category is referenced ADU, the "child" category is referenced ENF and the "teenager" category is referenced ADO. In FIGS. 5E and 5F, the "teacher" category is represented by ENS and the "student" category is represented by ETU. Time (T) is represented on the abscissa axis.

The system according to the present disclosure may have pre-recorded one or more patterns, determined as a function of said categories, of the frequencies of change from one category to another for said received requests, of the time elapsed between two received requests. The patterns can for example comprise one or more patterns as represented in FIGS. 5A to 5F which correspond to suspicious behaviors of the current user. The number and/or the update of these patterns can be determined during the configuration of the system, as a function of the categories of user of the device, or previously by a service operator.

According to the examples in FIG. 5, as previously indicated for FIG. 1, transitions are shown only between categories allowing the detection of suspicious behavior.

The data recorded for each pattern can for example comprise at least one data from the following data: at least one user category, at least one duration (for example a first (threshold) duration for a request to be considered or not considered as transient, a first duration of inactivity from which a time window is reinitialized) between two requests (for example between two requests of different categories), at least one sequencing between at least two categories, a first number and/or a first frequency of change of categories (threshold value) from which a behavior is considered suspicious.

FIG. 5A represents a first suspicious behavior pattern. It corresponds to one or more requests for adult content for a non-transient duration, namely at least several seconds, then to a consultation of child content over a longer non-transient duration. This behavior can be part of the suspicious behaviors because an adult rarely consults child content for a long time. A potential user of the shared terminal who would have such behavior is therefore probably a child who consulted a site for adults before consulting a site for children. It should be noted that the fact that there is no downtime on the terminal between the requests for child content and for adult content can enhance the detection of suspicious behavior.

FIG. 5B represents a second suspicious behavior pattern. It corresponds to one or more requests for child content for a non-transient duration, namely several seconds at least, then to a consultation of adult content over a non-transient, longer duration. In the same way as the behavior of FIG. 5a, this behavior can be part of the suspicious behaviors because rarely an adult consults child content for a long time. A potential user of the shared terminal who would have such behavior is therefore probably a child who has consulted a site for adults after having consulted a site for children.

FIG. 5C represents a third suspicious behavior pattern. It corresponds to a sequence alternating respectively:

one or more requests for adult contents for a total non-transient duration, one or more requests for child content, for a relatively short but non-transient duration, one or more requests for adult contents for a non-transient duration, one or more requests for child contents for a non-transient duration, lasting several minutes or more, one or more requests for adult contents, for a non-transient duration.

The behavior in FIG. 5C may be part of the suspicious behaviors because an adult rarely consults child content for a long time and intermittently. A potential user of the shared terminal who would have such behavior would therefore probably be a child who would consult at least one site for adults.

FIG. 5D represents a fourth suspicious behavior pattern. It corresponds to several sequences alternating respectively one or more requests for teenager content for a sufficiently long duration, greater than several seconds, then one or more requests for adult contents for a few seconds but longer than one or two seconds which could suggest a request made inadvertently. The behavior of FIG. 5d may therefore suggest that a potential user of the shared terminal who would have such behavior is a teenager who has consulted adult content.

Thus, in some embodiments, suspicious behavior can be detected as a function of at least a frequency of change of category of the contents associated with at least two requests. As shown in the example in FIG. 5d, a significant frequency of change of a content category makes it possible to detect suspicious behavior and generate an alert. It is meant by significant frequency of change, for example a change of category every 5 minutes at least for a time window of 15 minutes, a change every 10 minutes at least for a time window of 60 minutes.

FIGS. 5E and 5F represent two examples of suspicious behavior patterns in an environment other than that of the parental control, namely the teaching environment. To this end, the categories defined by the MOD_SEQ module are "teacher" and "student".

FIG. 5E represents a first suspicious behavior pattern in the teaching environment. It corresponds to a sequence alternating respectively:

one or more requests for student content for a non-transient duration, one or more requests for teacher content for a non-transient duration of a few seconds, less than the previous duration of consultation of student content, one or more requests for student content for a non-transient duration, one or more requests for teacher content for a non-transient duration, less than the previous duration of consultation of student content, one or more requests for student content during a non-transient duration.

The representative behavior in FIG. 5E may therefore suggest a student accessing teacher content. Here, it can for example be access to applications when it comes to requests.

FIG. 5F represents a second suspicious behavior pattern in the teaching environment. It corresponds to a sequence alternating respectively:

one or more requests for teacher content for a non-transient duration, one or more requests for student content for a non-transient duration, greater than the previous duration of the sequence, one or more requests for teacher content, for a non-transient duration of a few seconds, less than the previous duration of consultation of student content, one or more requests for student content for a non-transient duration.

The representative behavior of FIG. 5F may therefore suggest a student accessing teacher content.

A set of conditions can characterize suspicious behavior:

Let N be the number of category changes with return to the initial category, over a given time window of limited duration T (for example passage from the "child" category to the "adult" category then back to the "child" category).

According to a first condition, N can have a minimum value ($N \geq N_{min}$), that is to say a minimum number of category changes must be observed with return to the initial category during the observation window, $N_{min}$ is an integer such that $N_{min} \geq 1$, for example $N_{min}=3$.

According to a second condition, the category changes can have a minimum duration ($D_m$) to be taken into account in the calculation of N: in the example above, the "adult state" plateau has a minimum duration, for example $D_m=5$ seconds.

According to a third condition, the N category changes can occur over a sliding observation window, of limited duration T (for example T=30 minutes).

Thus, there may be a link between T (duration of the sliding observation window) and N (number of category changes):

$$T = \sum_{i=1}^{n} \alpha i + \sum_{i=1}^{m} \beta i \qquad \text{[MATH. 1]}$$

$$N = ARRONDI.INF\left(\frac{n+m}{2}\right), \qquad \text{[MATH. 2]}$$

where ARRONDI.INF is the rounded down integer; $\alpha i$ and $\beta i$ being respectively the duration of the requests for a first content and the requests for a second content, between each change of content category, n representing the number of periods of requests for content of the first category, interspersed with m periods of requests for content of the second category.

FIG. 6 represents one embodiment of a method according to the present disclosure. This method is preferably implemented by one or more terminals 1 or the access gateway 2.

The time window can comprise, for example, successive requests for content, that is to say the time window does not comprise a period of inactivity of the device issuing the requests.

According to another example, the time window can comprise requests spread over periods of activity and inactivity of the device issuing the requests. The periods of inactivity possibly corresponding to a change of user of the device, the method can optionally comprise, in some embodiments, a filtering of these periods of inactivity and/or a reinitialization of the time window after certain duration of inactivity. This filtering and/or this resetting can be optional, in some embodiments.

The method comprises a step E1 of subscribing to suspicious behavior detection service. This step can be optional in some embodiments, for example when the user downloads such an online service, such as an application and therefore does not need to subscribe to a paid service for example. Preferably, this step is implemented by the module MOD_SOUSC described previously.

During a step E2, one or more content access requests are received over at least one time window. These access requests are requests for access to content associated with a category. As mentioned before, by content request it can also be understood the use of applications. These requests are transmitted to the external network by the gateway 2. They are also collected by the module MOD_COL described above. Optionally, the requests collected can also be filtered by a filtering module, such as the module MOD_FILT described in FIG. 4, in order to select, for the rest of the steps of the method, only the requests coming from some devices, for example shared devices or a selection of the shared devices or the requests for contents of some categories, for example not keeping the "all users" category (for weather or cooking type content, for example).

The following steps E3, E4 and E5 allow the generation of an alert as a function of at least one frequency of change of category of the contents associated with at least two requests and/or of the time elapsed between two requests. Such alerts can for example be generated in the different embodiments cited below by way of example in relation to the determination step E3.

According to at least one embodiment, during step E3, following the receipt of a sequence of successive requests during a time period during step E2, the method can comprise the determination over the time window of sequencing information determined from the frequency of change of categories of content associated with at least two requests and/or from the time elapsed between two requests.

According to at least one embodiment, suspicious behavior patterns are determined beforehand, for example by the sequencing module MOD_MODELE previously described. These patterns are determined as a function of the categories, the frequencies of change from one category to another for the received requests, and/or the time elapsed between two received requests. The sequencing information is obtained by storing the requests, the associated categories and the frequency of change and/or the time elapsed between two received requests. The observation time window can in particular be a sliding time window, and for example be an observation window permanently activated. The requests from the terminal are permanently observed and compared with the recorded patterns.

When a comparison is positive, step E4, suspicious behavior is detected. An alert is generated, as a function of the at least one pattern and the requests received during the time period. We then move on to step E5. Moreover, even if the comparison is positive, the window can remain active and the suspicious behavior detection method can remain active. When the comparison is negative, then the time window remains open.

The comparison made during step E4 can for example measure a distance between the closest pattern and the sequencing of the requests and when this distance is below a threshold, determine suspicious behavior. The patterns constitute behavior templates. The periods indicated in the patterns of FIG. 5 and the periods indicated in the behaviors of FIG. 1 are different. Thus, this comparison can take into account each period of time spent for each category of the user requests and thus compare a behavior with one or more patterns by comparing the time of each period with the time of a corresponding pattern. The comparison pattern can take into account the overall form of the patterns and compare it to the form constituted by the requests of the user.

As an example, a user behavior for which the comparison with associated sequencing information shows that the closest pattern is that of FIG. 1C is considered.

Initially, a child behavior for a duration ($\gamma$1), immediately followed by an adult behavior for a duration ($\gamma$2) is detected.

The case is considered where $\gamma$1 and $\gamma$2 are durations (for example greater than 3 seconds) which are not considered as transient periods, making it possible to exclude the case of access to content by mistake or inadvertently (the case of a child who inadvertently clicks on adult content, immediately realizes it and immediately closes the application).

Immediately after $\gamma$2, a possibility of suspicious behavior is detected because a child behavior immediately followed by an adult behavior is observed and the case of the access to a content by mistake has been excluded. This is a possibility of suspicious behavior, but it can also be a simple change of user of the terminal, for example the switching from a child user to an adult user. There is therefore a risk of erroneous detection (also called "false positive"). In such an embodiment, the system can then only generate a local alert and transmit a notification to the terminal of the user, for example by the display of a message on the screen and not transmit an alert to a remote terminal (that of the administrator user or of the parent). In some embodiments, the generation of an alert may give rise to a recording of the alert in a log file. According to the embodiments, this recording may be systematic, even when the alert is only local (for a fine follow-up of the requests made from the terminal), or not be made for a local alert (so as not to "overload" the log file with "false positives").

The following periods of observation $\gamma$3, $\gamma$4, $\gamma$5 enhance a detection of suspicious behavior because the sequencing of a second child transition during the period $\gamma$3, then adult transition during the period $\gamma$4 then child transition during a period $\gamma$5, is considered as a characteristic of a child accessing adult contents.

In this example, $\gamma$3, $\gamma$4 and $\gamma$5 are all three greater than a transient duration, which makes it possible to exclude the case of content access by mistake.

Since, the detection of suspicious behavior is thus enhanced during the periods $\gamma$3, $\gamma$4 and $\gamma$5, a notification is transmitted at the end of the period $\gamma$5 to a remote terminal. The form of this notification may vary according to the embodiments.

According to at least one embodiment, in step E3, when the requests are issued by a terminal, the determination of suspicious behavior relates to suspicious behavior of a user of the terminal for at least one time period. The patterns are then associated for example with a user profile. Indeed, it can be determined from the patterns presented in FIGS. 5a, 5b, 5c that it is a pattern associated with a child profile, while the pattern in FIG. 5d is associated with a teenager profile. Similarly, the profiles in FIGS. 5e and 5f are associated with student profiles. According to at least one embodiment, the method can comprise the generation of an alert taking into account a profile of the user of the terminal based on information on the sequencing of the requests received prior to or during said time period.

According to at least one embodiment, the method can comprise:

the determination of the profile of the user of the terminal during at least one time period from the information on the sequencing of the requests received prior to or during the time period. It can indeed be provided to determine, prior to any monitoring, who is the user of the terminal. As seen previously, one or more requests for child contents for a long, non-transient duration makes it possible to determine that the profile of the user is a child profile. The profile of the user can be related to the age of the user or in the case of the university, to the function of the user.

the comparison of the sequencing information with at least one pattern takes into account the determined user profile. Thus, the method is more robust because it detects beforehand with more certainty in which category the user is. This can make the subsequent comparison simpler. The comparison can be made during a step E4.

According to at least one embodiment of step E3, the patterns may not be determined beforehand. In this embodiment, the module MOD_COMP can be based only on the determined sequencing information by analyzing the latter as it is received. For example, in such an embodiment, the module MOD_COMP can be based on changes of categories of the requests received, the frequency of change of category of the contents requested and/or the time elapsed between each category change. In some embodiments, in relation to parental control, it can be in particular possible to detect suspicious behavior by detecting one or more requests for access to child content for a non-transient duration then a request for access to adult content on a shorter time than the previous duration during which child content was requested, then again one or more requests for access to child content for a non-transient period of time longer than the duration during which adult content was requested. The method can for example use an algorithm of correlation of the frequencies of switching between categories and the times of use by category.

The algorithm used may for example not take into account the transient requests, as defined above and/or take into account a number and/or a frequency of transient requests. Of course, if these transient requests are very frequent, for example when it is detected that a user is a child because the requests are requests for "child" category content and when there are frequently, every minute for example, transient requests for "adult" category contents, a determination of suspicious behavior can be made. According to this example, the method can detect suspicious behavior if the frequency of change of a content category is high over the time window. For example, by high frequency, it can be said that every 20 seconds, a change of category is detected over a time window of 10 minutes.

Conversely, if a single transient request appears for a long period of time, during a time window, then no notification is issued.

The algorithm can take into account the durations between content category changes. For example, if the requests are requests associated with child content, for a period of time greater than several seconds and if several times, for example for periods of duration shorter than the durations associated with child content requests, there are requests associated with adult content, then suspicious behavior can be determined during step E4. According to this example, the method can detect suspicious behavior if during a time window, the requests for content of a certain category are made for a short duration and requests for content of another category are made for a long duration.

The method also optionally comprises a step E5 of transmitting a notification or the generated alert when suspicious behavior has been determined. This notification can be transmitted:

to the terminal having issued the requests, or to a terminal other than the terminal having issued the requests, for example a terminal of an administrator of a local area network, which for example can be a parent in the context of parental control, or to the terminal having issued the requests and to a remote terminal.

This "other" terminal can for example be a remote terminal, not connected to the local area network. This notification can be sent to another person declared for example during the subscription to the service. The subscription module MOD_SOUSC can also provide that this notification is transmitted only following the determination of suspicious behavior over at least two time windows, being for example able to be disjoint in time.

As mentioned above, the notification can be transmitted to the monitored terminal, in order to warn the user that his behavior has been detected as suspicious. For example, during a first detection of suspicious behavior, a notification is transmitted only to the terminal having issued the requests and during a second detection (or in case of a continuous time window if the suspicious behavior persists), it can be transmitted alternatively or in addition to another terminal.

The local notification can optionally be "acknowledged" by the user (for example by entering a password) in order to avoid the generation of new notifications (to avoid disturbing an "authorized" user due to the detection of "false positives").

The notification can be transmitted in different forms, chosen among:

a text message, an email, a message intended to be displayed on a terminal, a message intended for an application recorded on a terminal.

By message intended to be displayed on a terminal it is meant for example the opening of a window on a screen of the user of the terminal or on a screen of another terminal.

In one embodiment, the generation of an alert comprises the recording of information relating to the alert, the recording being able to be made in the terminal generating the requests or in another remote terminal, or in both.

In some embodiments, combinable with the previously described embodiments, a confidence score can be associated with the detection of suspicious behavior. When this confidence score is below a first value (or threshold), the generation of an alert can comprise the transmission of a notification only to the terminal issuing the requests. When this confidence score is above the threshold or a second value (or threshold), possibly equal to the first value, the generation of an alert can comprise the transmission of a notification to the terminal issuing the requests and to a terminal other such as that of an administrator or that of a user whose profile is associated with another category.

In some embodiments, a maximum number of notifications can be parameterized, or a maximum number per day, for example 5 notifications. Restrictions on access to remote sites from the terminal can for example be implemented, in some embodiments, once this maximum number has been reached.

It is important to note that the time window is activated and sliding. The observation over a time window can be done as long as no suspicious behavior is determined and continue beyond, the observation can therefore be done continuously.

What is claimed is:

1. An alert method implemented in an electronic device, the method comprising:
   receiving, over at least one time window, a plurality of content access requests for accessing contents associated with categories, and
   generating an alert as a function of at least one frequency of change of a content category between contents associated with at least two of said plurality of content access requests and/or of the time elapsed between two of said plurality of content access requests.

2. The method of claim 1, wherein said at least one time window does not comprise a period of inactivity of said electronic device.

3. The method of claim 1, further comprising:
   determining of at least one pattern, as a function of said categories, of frequencies of change from one category to another of content access requests, and/or of a time elapsed between two content requests of said plurality of content access requests, and
   generating an alert being determined from said at least one pattern and said plurality of content access requests received over said at least one time window.

4. The method of claim 3, wherein:
   said plurality of content access requests are issued by a terminal and said alert relates to at least one access of a user of said terminal during said at least one time window,
   said patterns are associated with a user profile, and
   said generation of an alert taking into account a profile of the user of the terminal based on information on the sequencing of said plurality of content access requests received prior to or during said at least one time window.

5. The method of claim 4, wherein said user profile is related to the age or/and to the function of said user and said categories are related to the age or to the function of said user, said categories being parameterizable.

6. The method of claim 3, wherein said generation of an alert takes into account at least a distance between said at least one pattern and said sequencing of said plurality of content access requests received during said at least one time window.

7. The method of claim 1, wherein the generation of an alert comprises one or more of:
   transmitting at least one notification to the terminal having issued said plurality of content access requests, and
   transmitting at least one notification to an administrator terminal different from said terminal having issued the plurality of content access requests, wherein said notifications are transmitted in one or more forms chosen from:
   a text message,
   an email,
   a message intended to be displayed on a terminal, and
   a message intended for an application recorded on a terminal.

8. The method of claim 7, wherein said receipt and said generation of an alert are made over a plurality of time windows, said transmission of at least one notification being triggered following the generation of an alert over at least two time windows.

9. The method of claim 7, wherein the generation of an alert is associated with a confidence score, and
   when the confidence score is below a first threshold, the generation of an alert comprises transmitting a notification to said terminal having issued the plurality of content access requests, and
   when the confidence score is above a second threshold, the generation of an alert comprises transmitting a notification to said terminal having issued the plurality of content access requests and to a second terminal different from said terminal having issued the plurality of content access requests.

10. The method of claim 7, wherein a maximum number of notifications transmitted over a given duration can be parameterized and restrictions on access to at least one content can be triggered once this maximum number has been reached.

11. The method of claim 1, wherein the generation of an alert comprises recording information relating to said alert in said device or in a remote device.

12. A device for generating an alert, the device comprising one or more processors configured together or separately to:
   receive, over at least one time window, a plurality of content access requests for accessing contents associated with categories, and
   generate an alert as a function of at least one frequency of change of a content category between contents associated with at least two of said plurality of content access requests.

13. The device of claim 12, wherein said at least one time window does not comprise a period of inactivity of said electronic device.

14. The device of claim 12, further configured to:
   determine at least one pattern, as a function of said categories, of frequencies of change from one category to another of content access requests, and/or of a time elapsed between two content requests of said plurality of content access requests, and
   generate an alert determined from said at least one pattern and said plurality of content access requests received over said at least one time window.

15. The device of claim 14, wherein:
   said plurality of content access requests are issued by a terminal and said alert relates to at least one access of a user of said terminal during said at least one time window,
   said patterns are associated with a user profile, and
   said generation of an alert taking into account a profile of the user of the terminal based on information on the sequencing of said plurality of content access requests received prior to or during said at least one time window.

16. The device of claim 15 wherein said user profile is related to the age or/and to the function of said user and said categories are related to the age or to the function of said user, said categories being parameterizable.

17. The device of claim 14, wherein said generation of an alert takes into account at least a distance between said at least one pattern and said sequencing of said plurality of content access requests received during said at least one time window.

18. The device of claim 12 wherein the generation of an alert comprises one or more of:

a transmission of at least one notification to a terminal having issued said plurality of content access requests, and a transmission of at least one notification to an administrator terminal different from said terminal having issued the plurality of content access requests, wherein said notifications are transmitted in one or more forms chosen from:

a text message, an email, a message intended to be displayed on a terminal, and a message intended for an application recorded on a terminal.

19. The device of claim 18, wherein said receipt and said generation of an alert are made over a plurality of time windows, said transmission of at least one notification being triggered following the generation of an alert over at least two time windows.

20. A non-transitory computer-readable recording medium on which is recorded a computer program including instructions for executing a method according to claim 1.

\* \* \* \* \*